United States Patent [19]

Bailey et al.

[11] Patent Number: 4,615,618
[45] Date of Patent: Oct. 7, 1986

[54] APPARATUS FOR DETERMINING THE RELATIONSHIP OF VEHICLE THRUST LINE, AND BODY CENTER LINE FOR USE IN WHEEL ALIGNMENT

[75] Inventors: Michael P. Bailey; Raymond G. Brooks; James R. Frank, Jr., all of Ravenna; Justin J. J. Johnson, North Ridgeville; Mark B. Maholm, Uniontown, all of Ohio

[73] Assignee: JVI Laser Systems Inc., Ravenna, Ohio

[21] Appl. No.: 622,840

[22] Filed: Jun. 21, 1984

[51] Int. Cl.⁴ .................. G01B 11/26; G01B 5/24; G01B 5/25
[52] U.S. Cl. .................. 356/152; 33/203.17; 33/203.18; 33/288; 356/155
[58] Field of Search ............. 33/203.18, 203.17, 288, 33/336, 337; 356/152, 155

[56] References Cited

U.S. PATENT DOCUMENTS

3,963,352  6/1976  Rishovd et al. .............. 33/288
4,338,027  7/1982  Eck ........................... 356/155

Primary Examiner—S. C. Buczinski
Attorney, Agent, or Firm—Yount & Tarolli

[57] ABSTRACT

Apparatus is provided for determining the relationship between a vehicle's thrust line and the vehicle's body center line. A movable light source is located externally of and independent of the vehicle and serves to establish a pair of reference light beams falling in parallel planes and which are spaced apart sufficient to permit a vehicle to be positioned longitudinally therebetween. The vehicle's thrust direction is determined by mounting sensors on the nonsteerable wheels so as to extend transversely away from the vehicle's body to intercept the light beams, together with circuitry for providing output indications dependent upon the location of light interception and which indications are representative of the vehicle thrust direction. The body center line is determined by employing targets which are mounted to body sides of the vehicle to intercept reference light beams. The targets on each side include a first slotted target which is positioned near one end of the vehicle to permit passage therethrough of the reference light beam and a second scaled target positioned rearwardly of the first target so as to intercept the light beam passed by the first target. The light source is moved until the scale readings of both sides of the vehicle are equal, then the body center line is defined as an axis midway between the two reference light beams.

30 Claims, 11 Drawing Figures

APPARATUS FOR DETERMINING THE RELATIONSHIP OF VEHICLE THRUST LINE, AND BODY CENTER LINE FOR USE IN WHEEL ALIGNMENT

BACKGROUND OF THE INVENTION

This invention relates to the art of wheel alignment diagnostic systems and, more particularly, to improvements permitting alignment with respect to an equilibrium center line wherein the vehicle's thrust direction coincides with the vehicle's body center line.

The invention is particularly applicable for use in conjunction with aligning all four wheels of a unibody vehicle and is described with particular reference thereto; although, it is to be appreciated that the invention may be used in various vehicles whether frameless or not.

Historically, damaged vehicle bodies are repaired at body shops for correction of the body damage and of any frame damage. Wheel alignment work is done at a separate, and frequently independent, alignment shop. The typical alignment shop is not provided with equipment to diagnose wheel alignment problems that may be caused by body misalignment as opposed to damaged or improperly installed suspension components. Until recently, with the advent of unibody vehicles, this deficiency in the alignment shop has not been a significant problem since a typical vehicle had a solid axle rear drive mounted to a frame and the front wheels were aligned based on the assumption that the frame was not bent and that the solid axle rear drive was in proper alignment relative to the frame.

However, with the advent of today's unibody vehicles, the body is also the structure of the vehicle and the suspension is often fastened directly to the body. There is often little or no suspension adjustment. Thus, there may be no castor and no camber adjustment and only toe adjustment. Consequently, body alignment and suspension alignment are closely related, particularly with respect to unibody vehicles.

An alignment shop can no longer assume that the chassis is straight. In making a wheel alignment analysis there should be a determination as to whether it is a body related problem or is it in the suspension itself. Thus, an alignment shop now needs to be able to measure like a body shop. Alignment equipment should be capable of measuring the suspension relative to the body center line.

The prior art respecting wheel alignment apparatus is replete with examples wherein an active sensor, such as a light beam projector, is mounted directly to a vehicle component, such as a steerable wheel. A light beam is then projected at a target mounted to the nonsteerable wheel. The alignment information relative to the nonsteerable wheel is used in determining what the steerable wheel alignment should be. An example of such prior art is found in the patent to Hunter, U.S. Pat. No. 4,265,537. Such prior art makes an assumption with respect to the correctness of the alignment of the nonsteerable wheel relative to its mounting structure. If the rear axle of the vehicle being analyzed is bent, or the frame to which it mounted is bent, then the reference to such a rear wheel is not an accurate reference point. Additional examples of wheel alignment systems employing active alignment equipment operatively mounted on either the steerable or nonsteerable wheels or both are found in the patents to Hunter, U.S. Pat. No. 4,302,104 and Lill, U.S. Pat. No. 4,402,603.

Even body shop equipment for checking alignment of vehicle frame and body portions typically includes mounting active sensors to the frame or body parts. An example is found in the patent to Eck, U.S. Pat. No. 4,330,945.

The prior art does provide a teaching of employing active elements, such as laser transmitters, which are mounted independently of a vehicle body or suspension system and with the laser transmitters being mounted on a portable support device. This is shown in the patent to Eck, U.S. Pat. No. 4,338,027. However, while this patent provides such externally mounted laser transmitters, there is no recognition in the patent of determining the thrust direction of the vehicle and its relationship to the vehicle's body center line.

The VanBlerk U.S. Pat. No. 4,383,370 is similar to the earlier mentioned patents in that it employs active sensor units mounted to the vehicle's wheels. However, this patent does present a teaching that the thrust line of a wheel system should correspond with the geometric axis of the frame. There is, however, no recognition representative of the desirability of using light transmitting means mounted externally of the vehicle for determining the relationship of the vehicle's thrust line to the vehicle's body center line.

The present invention includes a recognition that present day wheel aligning equipment, with the exception of Eck U.S. Pat. No. 4,338,027, typically mount the active sensing transducer to the vehicle's body. This is a basic assumption respecting the correctness of a vehicle component. The present invention makes no assumption regarding the correctness of any vehicle component, such as the chassis, frame, axle, body, etc. Instead, the active sensing components are located externally and totally independent of the vehicle.

Another recognition made by the present invention is the desirability of relating the vehicle's thrust direction or thrust line to the vehicle's body center line. When these two are coincident, they produce an equilibrium center line at which all force components of the left side of the vehicle are equal to and opposite to all of the force components of the right side of the vehicle. When these force components are in harmony, then the vehicle is in equilibrium, and the correct direction of travel of the vehicle will be along that defined by the equilibrium center line.

In practicing the invention, it is contemplated that the relationship of the vehicle's thrust line to the body center line will be determined. If the two coincide, then the vehicle is in harmony and an equilibrium center line is defined with all force components being in balance. With this accomplished, the wheels may then be aligned with respect to the equilibrium center line. If the vehicle's thrust line and body center line are not coincident, then a decision should be made as to whether it is economically practical to bring the two into harmony. This should be practical in vehicles having adjustable rear ends. Thus, most independent rear axle vehicles may be adjusted as described in their vehicle service manuals in order to bring the vehicle thrust line into coincidence with the body center line, producing an equilibrium line. In solid rear axle vehicles it may be necessary to make alterations to readjust the axle carrier mechanism to bring the vehicle into equilibrium. In such a solid rear axle vehicle, an insurance company, in a wrecked vehicle situation, may choose to scrap the vehicle rather than incur the expense of repositioning the axle carrier. If there is a minor variance between the thrust line and the body center line, and, providing no driveability problem exists, a compromise may be made by aligning the vehicle's suspension to the thrust line, thereby avoiding the cost of repositioning the axle carrier.

SUMMARY OF THE INVENTION

It is therefore a primary objective of the present invention to determine the relationship between a vehicle's thrust line and that of the vehicle's body center line.

It is a still further object of the present invention to achieve such a determination employing active sensor means which are located externally of a vehicle being inspected.

It is a still further object of the present invention to provide such a determination employing a movable light source device which is located externally of a vehicle being inspected.

It is a still further object of the present invention to provide such an alignment system which may be easily implemented for aligning all wheels of a vehicle.

In accordance with the present invention, a determination is made as to the relationship of a vehicle's thrust line and the vehicle's body center line. A movable light source is spaced from and is independent of the vehicle to be inspected. This is used to establish a pair of reference light beams which fall in parallel planes spaced apart sufficient to position a vehicle therebetween. The vehicle's thrust line is determined by mounting light beam sensors on nonsteerable wheels of the vehicle for intercepting the reference light beams. The location of light beam impingement on the sensors is employed together with calculating circuitry for providing an output indication representative of the vehicle's thrust line. The vehicle's body center line is determined by attaching body side targets to the vehicle's body along the opposite sides thereof. Forwardly located vertically slotted targets are attached to like body side locations and the vertical slots are equally positioned from the vehicle to permit the light beams to pass therethrough. The rear targets are attached to like body side locations longitudinally spaced from the front targets. The rear targets are equally spaced from the vehicle and are located to intercept the light beams. If the light beams impinge upon the rear targets at different horizontally measured locations, then the body center line is not coincident with the thrust line. The light source is then moved from its thrust line determining position in a transverse direction until the light beams impinge on the rear body side targets at like horizontal distances from the body sides. The distance moved is measured and it represents the displacement of the body center line from the thrust line.

BRIEF DESCRIPTION OF THE DRAWINGS

The forgoing and other objects and advantages of the invention will become more readily apparent from the following description of the preferred embodiment of the invention as taken in conjunction with the accompanying drawings which are a part hereof and wherein.

DESCRIPTION OF THE PREFERRED EMBODIMENTS

Figure 1:
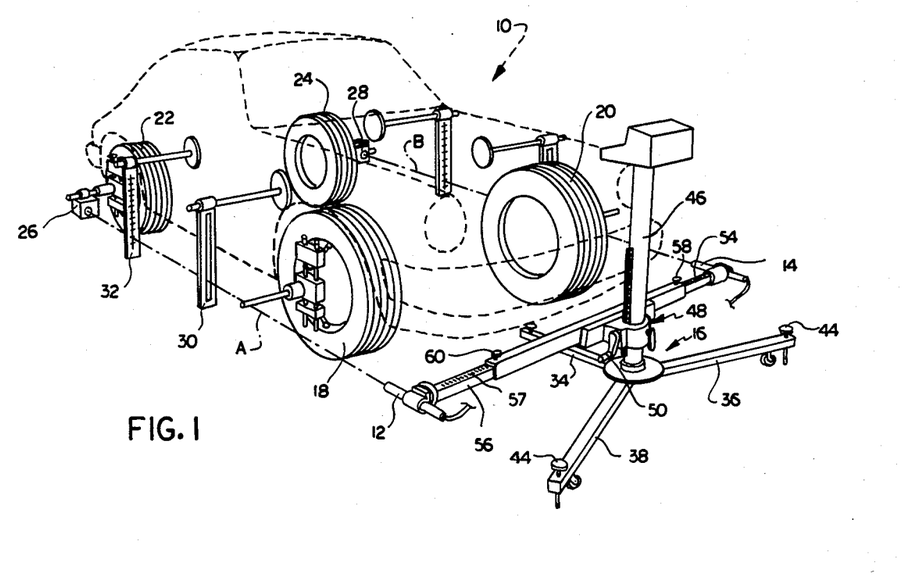
FIG. 1 is a schematic perspective view illustrating a vehicle being analyzed in accordance with the invention.

Reference is now made to the drawings which are for purposes of illustrating a preferred embodiment of the invention only, and not for purposes of limiting the same. Reference is now made to FIG. 1 which schematically illustrates a vehicle 10 undergoing an alignment analysis in accordance with the present invention. A pair of laser transmitters 12 and 14 are mounted on a movable support 16 which may be moved relative to the vehicle 10. The laser transmitters 12 and 14 serve during operation to transmit reference beams A and B in spaced apart parallel planes on opposite sides of the vehicle.

As shown in FIG. 1, the vehicle is positioned such that its front wheels 18 and 20 are in a forward position, and its rear wheels 22 and 24 are in a rearward position. As will be brought out in detail hereinafter, the vehicle thrust direction measurement is made in accordance with the invention by, in part, mounting sensor heads 26 and 28 on the right rear and left rear wheels, respectively. These sensor heads are positioned to intercept the reference beams A and B and serve in conjunction with associated circuitry to determine the thrust direction or thrust line TL of the vehicle. Also as will be described in greater detail hereinafter, the vehicle's body center line BCL is determined with the use of front and rear body side targets 30 and 32. Each is removably mounted to a side portion of the vehicle. The forward body side target 30 is provided with a slotted aperture through which a reference beam may pass and then impinge upon the rear body side mounted target 32. The rear target 32 is graduated and has a scale thereon to aid in measuring the point of impingement of the beam. As will be brought out in greater detail hereinafter, the body side targets 30 and 32 are mounted on opposite sides of the vehicle at respectively like side body positions and spaced by like amounts from the vehicle. The reference beams are positioned, by moving support 16, until the laser beams strike like locations on the rear targets. The body center line BCL will be an axis midway between the reference beams.

Portable Laser Transmitter Support

Figure 2:
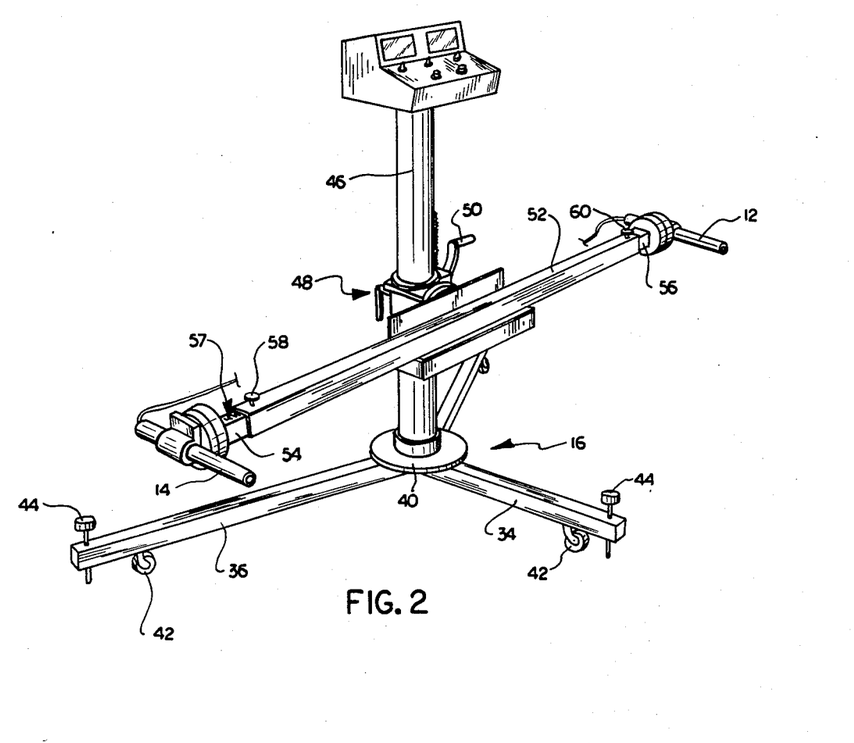
FIG. 2 is a perspective view illustrating the portable light transmitting support in greater detail than that of FIG. 1.

The portable laser transmitter support 16 is best shown in FIGS. 1 and 2, and includes three horizontally extending support legs 34, 36 and 38 spaced apart by approximately 120° and to which there is suitably secured a disc shaped support plate 40. This forms a pedestal structure. So that the structure may be easily moved about, each leg is provided with swivel-type wheels 42 suitably mounted to its underside. Located near the extremity of each leg there is provided an adjustable screw jack 44 which is threaded vertically through the leg for locking the pedestal structure in place on a garage floor, or the like, once the pedestal structure has been properly positioned relative to a vehicle being examined.

Extending vertically upward from and suitably secured to disc plate 40 there is provided a center column 46 and which may take the form, for example, of a cylindrical steel sleeve. The laser beam transmitters 12 and 14 are carried by a support structure which is adjustably mounted to the center column 46 so as to adjust the vertical height of the laser beam transmitters relative to a garage floor or the like. To this end, a collar 48 coaxially surrounds column 46 with the collar being provided with a crank and pinion arrangement 50 for cooperation with a suitable vertically oriented track located on column 46 so that the collar 48 may be cranked up and down. The collar 48, in turn, carries a horizontal, elongated hollow housing 52 which is centered relative to the collar. A pair of telescoping arms 54 and 56 are slidably carried within housing 52 and may be pulled outward therefrom so as to extend horizontally outward from the housing to adjust the location of the laser transmitters. Preferably, arms 54 and 56 are provided with scales 57 for reference to the center column 46 to assist the operator in adjusting the horizontal positioning of the arms relative to the center column. Once a proper adjustment has been made, the arms may be secured in place by means of screw pins 58 and 60 which extend through the housing 52 to make frictional engagement with the arms 54 and 56.

The laser transmitters 12 and 14 are mounted to the extremities of arms 56 and 54, respectively. Each laser transmitter is mounted so that it may pivot within a vertical plane to an adjustable location. This permits vertical adjustment of the point of impingement of the reference beams on the sensor heads 26 and 28 and on the body side targets 30 and 32.

Sensor Units and Targets

Figure 3:
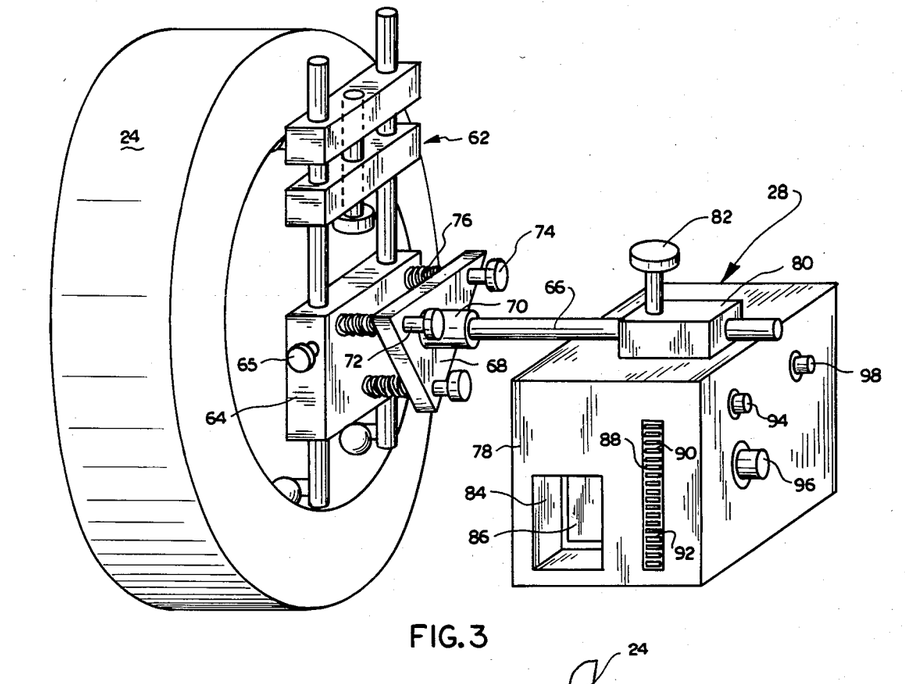
FIG. 3 is a perspective view illustrating a sensor unit attached to a vehicle wheel.

Reference is now made to FIG. 3 which illustrates a sensor unit, such as unit 28, mounted on a wheel 24. The sensor unit 28 is employed for determining the thrust direction of the vehicle and is also employed for analysis of toe, castor and camber on either steerable or nonsteerable wheels. During the process of determining the thrust line TL of the vehicle, a pair of sensor units 26 and 28, of identical construction, are mounted to the nonsteerable wheels, such as the rear wheels in the example of FIG. 1.

As shown in FIG. 3, each sensor unit is mounted to a vehicle wheel by means of a wheel clamp 62, which is of conventional design and includes an adjustable slide mechanism that grips the wheel's rims at the lip portions thereof so that a platform 64 carried by the clamp is located in a plane parallel to the plane of rotation of the wheel. In the embodiment of the invention herein, a spindle 66 is mounted to the platform 66 in such a manner that adjustments may be made to ensure that the spindle is coaxially aligned with the axis of rotation of wheel 24. The spindle 66 is threaded through a carrying plate 68 and is held in place against the plate by means of an internally threaded collar 70 so that the spindle extends perpendicularly from carrying plate 68. The carrying plate 68 is, in turn, mounted to the platform 64 by means of three bolts 72 each extending from platform 64 through suitable apertures located in a triangular orientation in plate 68. These are each held in place by a suitable wing nut 74. Each bolt 72 extends through a compression spring 76. The wing nuts are tightened to compress the springs, permitting adjustments may be made to the angular orientation of spindle 66.

With the spindle 66 being aligned relative to the axis of wheel 24, sensor unit 28 may now be attached to the spindle. The sensor unit 28 has a housing 78 on the roof of which there is a support member 80 having a cylindrical channel therein for slidably receiving spindle 66 so that the housing may be supported by the spindle and adjustably located along the length thereof. When the housing is properly located relative to the wheel, it may be locked into position as with a thumb screw 82.

The housing 78 is provided with an opening 84 which exposes the laser beam detector 86. As will be described in detail hereinafter, the detector 86 is mounted on a sled so that it may move forward and rearward of the opening 84 during its measurement operation so that the movement is always parallel to a plane perpendicular to spindle 66. Also, the laser detector 86 provides output information with respect to an X-Y grid as to the location of impingement of a laser beam thereon. The Y axis information is representative of the vertical positioning of the beam on the detector and this is relayed to the operator by means of a vertical array of twenty light emitting diodes 88 located on the housing adjacent opening 84. The vertical array is split in half with the upper portion 90 being of one color, such as red, and the lower portion of a second color, such as green. The number of light emitting diodes that are energized will help the operator determine whether the laser beam is at the centered position.

The housing is also provided with a zero-measure two-position switch 94 and a three position switch 96 for respectively selecting castor, camber or toe measurement operations.

Figure 4:
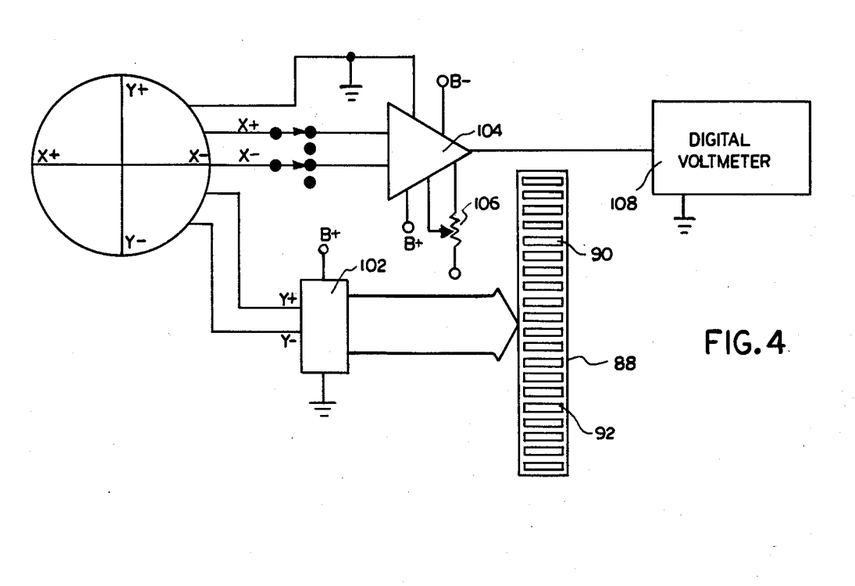
FIG. 4 is a schematic-block diagram illustration of the sensor unit circuitry.

The laser detector 86 serves to detect the point of beam concentration impingement of the laser beam as it strikes the face of the detector. As shown in FIG. 4, this detector takes the form of a position sensing photodiode device 100 which may be considered as being sectioned into an X-Y grid providing four quadrants. Detector device 100 may take the form of that provided by United Detector Technology, Model SC-25D. Device 100 provides information as to the point of concentration of a laser beam on the face of the detector. Two outputs are taken for each axis with the strength of the signal on each output being representative of the point of concentration of the laser beam along that axis. For the horizontal or X direction, then, the outputs are $+X$ and $-X$. Similarly, the outputs for the vertical direction are $+Y$ and $-Y$. Additionally, a fifth output is taken to ground potential. The vertical outputs, $+Y$ and $-Y$ are used for centering the laser beam in a vertical direction as it impinges upon detector 100. The $+Y$ and $-Y$ signals are supplied to a twenty step voltage comparator and driver circuit 102 which compares the difference between the $+Y$ and $-Y$ signals to drive the LED display array 88. There are ten red LED displays 90 and ten green LED displays 92. When an equal number of displays 90 and 92 are energized, then the point of concentration of the laser beam is at the vertical center of detector 100.

The $+X$ and $-Y$ signals are supplied a sum and difference amplifier 104 having a gain adjustment 106. The output from the amplifier 104 will be either a positive or negative signal, dependent upon whether the center of concentration of the laser beam is on the positive side of the X axis or the negative side of the X axis, or it will be zero if centered. This output is supplied to a conventional digital voltmeter 108 which supplies a digital readout up to one hundredth of an inch. The amplifier 104 provides an amplification factor of ten, for purposes of the toe in-toe out readings, as will be described below. Each sensor head 28 is provided with a digital voltmeter 108 and the two may be integrated in a single housing and removably mounted on top of the center column 46, as is illustrated in FIG. 1, so as to be easily viewable by an operator.

For toe in-toe out measurements and for conducting a determination of the thrust line of the vehicle, the laser detector 86 is moved from a zero position to a measuring position. This may be best appreciated with reference to FIG. 5, which schematically illustrates a sensor unit 28 mounted to a wheel 24 as by the wheel clamp spindle mechanism described above. Here, the sensor housing 78 is carried by a spindle 66 so that opening 84 of the housing faces the laser transmitter 16, to receive the reference laser beam B. It is to be noted that the laser beam is parallel to the vehicle's established direction of travel and wheel 24 of FIG. 5 has an extreme toe-in level. Initially, the sensor is positioned so that the laser beam B strikes the center of the X-Y grid network of the detector device 100 when in its zeroing position 110. Once this is achieved, the detector device 100 is moved a fixed distance to position 112, which is the reading position. That fixed distance in the example being given is exactly two inches. It is noted that the laser beam now strikes the detector device at a location which has been displaced horizontally by a distance C. This is an indication of the amount of toe in of the wheel 24.

Figure 5:
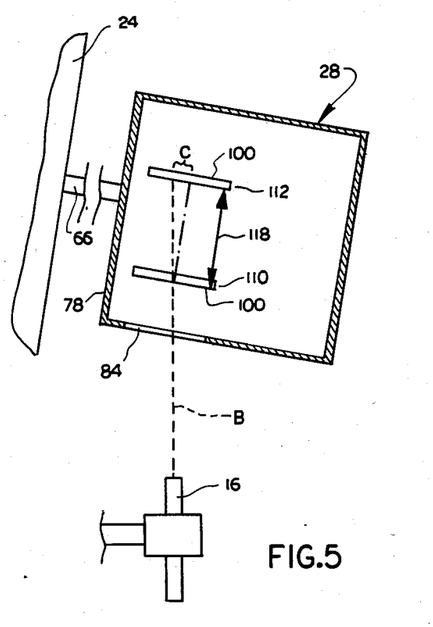
FIG. 5 is a schematic illustration of the toe measurement operation.

The toe is typically defined as the difference between the front and rear of a wheel at one end of a vehicle. If the wheel is closer to the body center line at the front of the wheel than it is at the rear of the wheel, then it is referred to as a toe in. Otherwise, it is referred to as a toe out. Toe measurements have typically been made to an industry standard of a wheel being considered as twenty inches in diameter. Toe measurements are made with respect to that standard. By using a two inch line of travel of detector 100, a correct reading of toe may be accomplished by multiplying the distance C by a factor of ten. That is the purpose of the multiplying factor of ten incorporated in amplifier 104.

Figure 6:
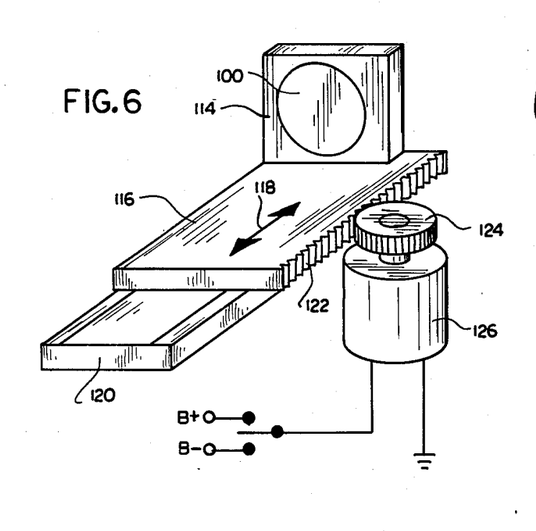
FIG. 6 is a perspective view illustrating a movable detector device within the sensor unit of FIG. 3.

Reference is now made to FIG. 6 which schematically illustrates the detector device 100 mounted in place by a suitable frame 114 and which, in turn, is suitably secured to a sled 116. The sled is movable back-and-forth in accordance with the arrows 118 which correspond with the movement illustrated in FIG. 5 and described immediately above. The detector is displaced along an axis perpendicular to the spindle 66. Sled 116 is slidably carried on a platform 120 secured to the housing 78. Platform 120 has ball bearing races on its upper surface for cooperation with the lower surface of sled 116 to facilitate movement back and forth in accordance with the arrows 118. Sled 116 is provided at one edge with rack teeth 122 which mesh with the teeth on a pinion 124 driven by a suitable DC reversible motor 126. This is operated by the two-position switch 94 located on housing 78 which is schematically illustrated in FIG. 3. Thus, by positioning the switch to make contact with the B+ voltage supply source, the sled is driven from the forward or zero position to its rearward or measure position, as shown in the drawings. When the switch is connected to B— voltage supply source, it reverses direction and drives the sled back to the forward or zero position.

Figure 7A:
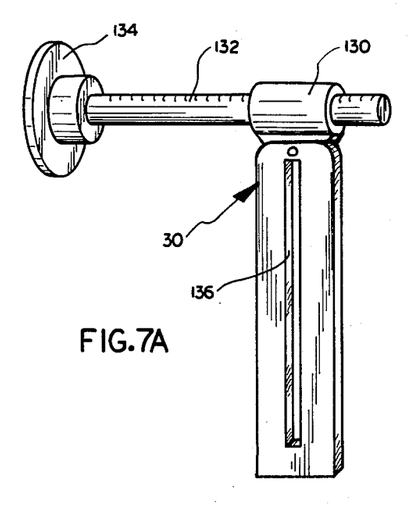
FIGS. 7A and 7B are illustrations of the front and rear body side targets.
Figure 7B:
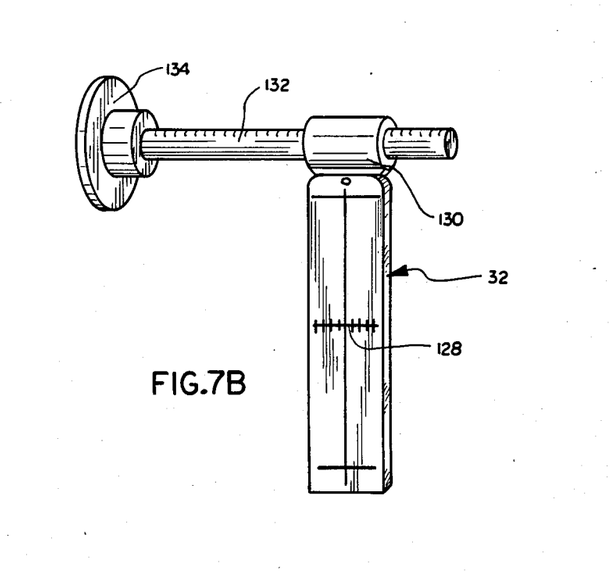

Reference is now made to FIGS. 7A and 7B which illustrate in greater detail the front and rear body side targets 30 and 32 used in conjunction with the laser beams for determining the body center line. Each target includes a flag portion 128 having a C-shaped hook 130 at its upper end by which the flag may be pivotally carried by a spindle 132 and which, in turn, is secured at one end to a body attachment device which may take the form of a magnetic attachment 134. The flag portion is a two part structure pivotable by gravity forces about an axis perpendicular to the spindle 132. It is contemplated that when used with nonmetallic body side portions, a vacuum attachment may be substituted for the magnet attachment.

The front body side target 30 is provided with an elongated vertically oriented slot 136. In operation, when the front body side target is mounted on the vehicle, the flag portion is slid axially along spindle 132 until the laser beam passes through the slot 136. Each of the spindles 132 for the front and rear body side targets includes scaling for easy determination of the horizontal displacement of the body target from the vehicle side panel to which the target is mounted. The flag portion 128 of the rear body side target 32 is provided with a horizontal and vertical grid scaling 138 for ease in determining the point of impingement on the target.

OPERATION

Having described the various components employed in a preferred embodiment of the invention, attention is now directed to the manner in which they are used for determining the relationship between a vehicle's thrust line TL and the vehicle's body center line BCL. If the two are coincident, then such coincidence defines the vehicle's equilibrium center line ECL.

Figure 8:
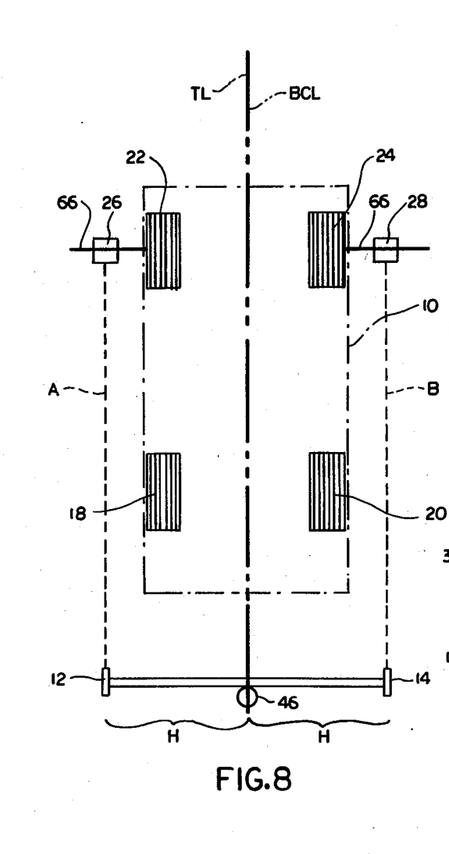
FIG. 8 is a schematic illustration of the operation involved to determine a vehicle's thrust line.

Referring now to FIG. 8, there is schematically illustrated a vehicle 10 being analayzed in accordance with the present invention. Preferably, the vehicle 10 is parked in a suitable garage or the like in which the components described hereinbefore may be set up for use. Preferably, the operator should center the steering wheel gear by rotating the steering wheel completely in a counterclockwise direction and then rotating it completely in the opposite or clockwise direction to determine how many turns from lock to lock. This is then divided by two and the wheel is turned in the first or counterclockwise direction one-half of the position from lock to lock. At this point, the operator should attach a wheel clamp 62 to each of the two nonsteerable wheels, in this case at the left rear and right rear of vehicle 10. Then, using the thumb screws 74, the operator can adjust each spindle 66 so that it is properly aligned with the axis of rotation of the associated wheel.

At this point, the vehicle 10 may be pulled up onto individual ramps for the rear wheels and individual turntables for the front wheels (not shown in the drawings herein). Sensor heads 26 and 28 may each be mounted on a spindle 66 attached to the rear wheels. The spindle 66 may have scales thereon. The sensor units 26 and 28 may be displaced axially from the associated wheels by equal amounts by making reference to the scaling on the spindles and/or by measuring to a known part on the wheel. Once properly positioned, the sensor units may be fastened in place by tightening thumb screws 82. The laser support 16 may now be wheeled into position with respect to the vehicle 10 and positioned forwardly of the front end of the vehicle with the center column 46 positioned so that it is midway between and centered with respect to the vehicle. The telescoping arms 54 and 56 may now be equally withdrawn from housing 52. These arms each have scaling 57 thereon so that the operator can easily determine that the arms have been equally withdrawn. At this point, the operator may lock the tripod support 16 in position by adjusting the screw jacks 44 until the screw jacks rather than the swivel wheels carry the weight of support 16. With the laser transmitters 12 and 14 being equally positioned relative to the center column 46, the laser beams may now be turned on and aimed at the sensor units such that each beam impinges upon the detector 86 therein. The operator should attempt to center the beam vertically so that it strikes the centermost location of each detecting device 100 relative to the X-Y grid thereof. If the beam is exactly on center relative to the horizontal axis, then, the digital voltmeter 108 associated with each sensor unit will provide a reading of 0.00. Stated otherwise, the left-right readings will be 0.00 and 0.00.

The operator should now check the vertical position at which light beams A and B strike the detecting devices 100 in the sensor heads 26 and 28. If the beam is displaced along the Y axis in either a positive or negative direction, this will be reflected by the number of LED devices that are energized in the light emitting array 88. The greater the beam is displaced from the zero reference, the greater the number of light emitting diodes will be energerized in either the positive direction, i.e., diodes 90, or the negative direction, i.e., diodes 92. As the beam becomes centered, then, either no light emitting diode will be energized, or possibly one of the diodes 90 providing a red indication, and one of the diodes 92 presenting a green indication or the like. At that point, the operator knows that the beam is vertically centered. If the beam is not vertically centered, the laser transmitters 12 and 14 may be adjusted by pivotally moving them about their axis so as to displace their light beams in vertical planes parallel to each other.

With the laser beams being centered both vertically and horizontally, the operator may now determine the thrust direction of the vehicle. This is achieved by positioning switch 94 on the sensor unit housing to the measuring position which will cause sled 116 to move from its forward position backwards by a distance of two inches to the measuring position 112. If the wheel on which that sensor unit is mounted exhibits toe-in or toe-out then the laser beam will strike the detecting device 100 at a point displaced horizontally from the zero reference by a distance C which may be either positive or negative.

In the example illustrated, a first testing for each of the sensor units 26 and 28 may result in readings taken from the digital voltmeters of left toe equals +0.05 and right toe equals −0.08. This indicates that operator should move the column center 46 to the left by a short distance, for example, on the order of ⅜ths of an inch.

After the column center has been moved to the left by ⅜ths of an inch, the operator then repeats the above procedure with the detecting devices 100 being returned to their zeroing position 110 by actuation of switch 94 to the zero position. The vertical position is checked and corrected as needed, and then a second toe reading is taken by actuating switch 94 to the measurement position. The second reading may result, for example, in a digital toe reading of left toe equals +0.04 and right toe equals −0.02. These measurements are given in terms of inches. This indicates that the center column 46 should be moved even further to the left by, for example, ¼ of an inch, and the procedure is repeated until the left toe reading and the right toe reading are the same. For example, the left toe reading may equal −0.00 and the right toe reading may equal +0.00. Once the two readings are equal, then the center column 46 is located on the thrust line of the vehicle and the body center line can be located.

In the case being illustrated in FIG. 8, the thrust line TL is coincident with the body center line BCL thereby defining the equilibrium center line. Also, in the example given in FIG. 8, the digital toe readings indicate that there is no toe in or toe out of measurable significance. The thrust line is located once the left toe and rear toe are of the same dimension (but of opposite sign, for example, left toe equal to −0.02 and right toe equal to +0.02 or left toe equal to +0.03 and right toe equal to −0.03). Some vehicle specifications call for toe in or toe out of the rear wheels or front wheels. However, the toe in or toe out should be the same on both sides of the vehicle. This can be checked against a specification chart provided by the vehicle manufacturer.

Figure 9:
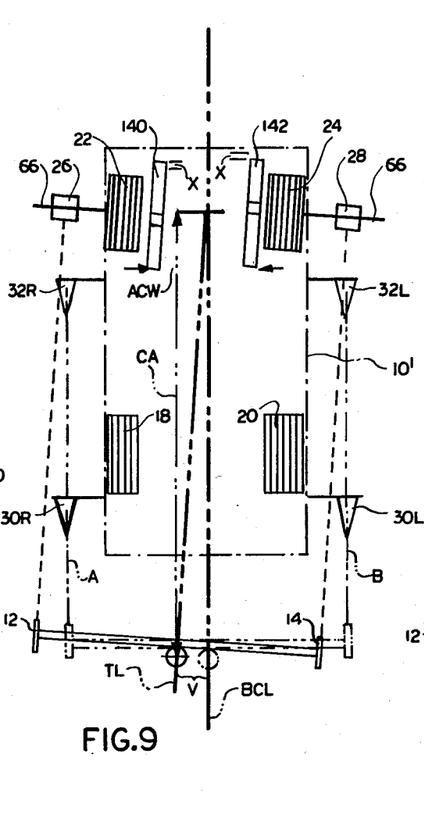
FIG. 9 is a schematic illustration of the operation involved to determine a vehicle's body center line.

Reference is now made to FIG. 9 which illustrates vehicle 10' being analyzed in accordance with the invention. In this case, the body center line BCL and the thrust line TL of the vehicle do not coincide. The operator proceeds as discusssed above to obtain the thrust line TL. Then, without moving the laser support 16, the operator attaches the body side targets on the left and right sides of the vehicle. The left and right targets 30L and 30R are respectively mounted to like locations on the left and right sides of the vehicle by means of the spindle and magnetic attachments discussed hereinbefore. These are slotted targets and are pulled out on their spindles by equal distances until the laser beams A and B pass through the slots in the targets. Similarly, rear targets 32L and 32R are mounted on spindles which are in turn attached to like side body portions on the left and right sides of the vehicle.

With the targets now being mounted to the vehicle and spaced equally on opposite sides of the body side panels, the operator may, if needed, equally adjust the telescoping arms 54 and 56 so that the laser beams pass through the slots in the front slotted targets 30R and 30L. However, if these beams do not strike like locations on the rear targets 32R and 32L, then, this is indicative that the body center line BCL is not coincident with the thrust line TL. The screw jacks 40 may now be loosened so that the operator may slightly move the laser support 16 to the left or right until the laser beams pass through the slotted targets and strike the rear targets 32L and 32R at like locations. At that point, the operator has found the body center line which is aligned parallel to the laser beams A and B and extending through the center column 46. The distance at which the column center has to be displaced to obtain this reading from the thrust line location indicates the variance V between the thrust line TL and the body center line BCL. This may now be used to calculate the reposition dimension required for bringing the thrust line TL into equilibrium with the body center line BCL.

In the above example with respect to FIG. 9, vehicle 10' may be an independently rear axled vehicle. In such case, the suspension system may be adjusted in accordance with the vehicle service manual so that the thrust line may be brought into coincidence with the body center line producing an equilibrium center line. However, if the vehicle is a solid rear axle vehicle, then, in order to bring the vehicle thrust line into conformance with the vehicle body center line, repositioning may be required to eliminate the variance V between the thrust and body center line.

Given the assumption that the vehicle of FIG. 9 is a solid rear axle vehicle, it may be provided with axle carrier such as carriers 140 and 142. These may take the form of leaf springs which are welded or bolted to the vehicle body. The leaf spring or axle carrier 140 needs to be moved forward by the dimension X, whereas leaf spring 142 needs to be moved rearwardly by a dimension X in order to eliminate the variance V.

The repositioning dimension X may be determined from the knowledge of the measured variance V between the thrust line and body center line as measured by the distance the center column 46 is moved in determining the body center line and the thrust line locations. In addition to the variance V, the calculation takes into consideration the distance CA taken from the axle center of the rear wheels to the center column 46 and the axle carrier width ACW as measured between the springs or axle carriers 140 and 142. Consequently, then, with these variables the reposition dimension X may be solved with the following equation:

$$X = \frac{ACW(V)}{CA}$$

Assuming, then, that the measurement taken is that the variance V is equal to two inches, the distance from the rear axle center to the center column 46, CA, is equal to 164 inches and that the distance between the axle carriers, ACW, is equal to 38 inches, then in solving for X, one finds that the reposition dimension is on the order of 0.46 inches.

Having repositioned the rear axle carriers in a solid rear axle vehicle or by adjusting an independent rear axle vehicle, the body center line and the thrust line may be brought into coincidence, thereby defining an equilibrium center line at which the factors of thrust and body are in harmony. The vehicle is in equilibrium and the correct direction of travel can best be described with the equilibrium center line. At this point, all comparisons of each wheel's geometry may be related to the equilibrium center line. The operator may now adjust the rear camber as needed following conventional techniques. Toe measurements of the rear wheels may now be made using sensor units 26 and 28 in the manner described above for determining the toe in or toe out relationships of the rear wheels. Once the toe measurements of the rear wheels correspond with the specifications provided by the vehicle manufacturer, then the sensor head and wheel clamps may be removed from the rear wheels. To save time in aligning a vehicle, four wheel clamps may be used with a second set mounted to the front or steerable wheels. The laser console stand should remain stationary and the wheel clamps should be mounted to the front wheels and adjust each spindle 66 correspond with the axis of rotation of the wheel to which it is attached. Then, the sensor heads may be placed on the front wheel spindles to do a front end alignment.

The front wheel castor and camber analysis may be accomplished with conventional techniques. It is suggested that the front brakes be locked and that the front castors be checked by turning the steering wheel in by 20° and then noting the appropriate meter readings and then turning the steering wheel out by 20° and noting the meter readings. After the camber and castor adjustments have been made, it is suggested that the front wheels then be analyzed for toe measurements employing the sensor heads in the same manner as discussed hereinbefore with respect to the rear wheels for either toe measurements.

Figure 10:
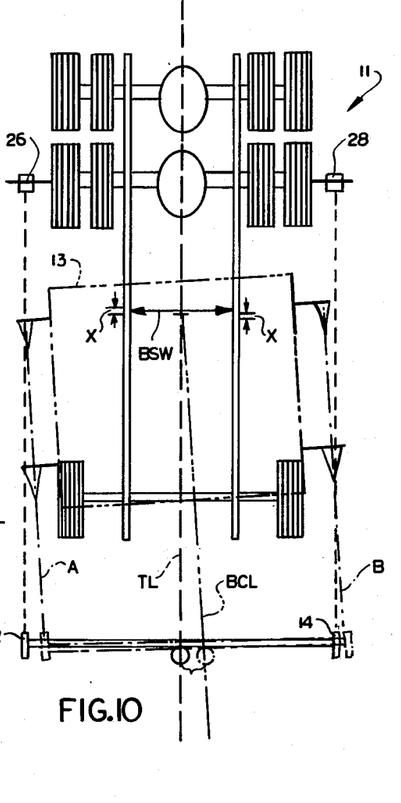
FIG. 10 is a schematic illustration of the operation involved to determine a heavy vehicle's thrust line and its relationship to its body center line.

Reference is now made to FIG. 10 which illustrates an application of the invention herein as applied to providing alignment analysis of a heavy frame vehicle, such as a tractor truck for long distance hauling. Here, such a vehicle 11 is illustrated wherein the sensor heads 26 and 28 in accordance with the invention are mounted to the rear wheels of a fixed axle. The thrust line TL is determined employing the laser transmitters 12 and 14 mounted on the portable stand 16 in the manner described hereinbefore. It may be observed from FIG. 10 that in this example the thrust line TL is coincident with the frame's center line. Thereafter, the body center line BCL is determined and the variance V between the thrust line and body center line as measured by the displacement of center column 46 is determined. In this case, a body or cab is mounted on the frame of the heavy duty vehicle and the repositioning dimension X indicates the cab 13 must be turned in a clockwise direction. This can be calculated by the equation used hereinbefore with some exceptions. Instead of measuring the variable of axle carrier width, a substitute variable will be the body support width BSW measured at the location for the repositioning dimension. Also, instead of the axle center to column center variable, a substituted variable BC is taken from the body support center to the column center, as is shown in the drawings. In this example, if the variance V between the thrust and body center lines is on the order of $3\frac{1}{2}$ inches, and the distance BC from the body center line to the console 46 is on the order of 94 inches and that the body support width BSW is on the order of 44 inches, then the value of X in this equation will be 1.64 inches. This means that in looking at the drawing the cab 13 must be moved rearwardly on the left side of the frame by the dimension X and that the body be moved forwardly on the right side of the frame by the dimension X in order to bring the thrust line TL and body center line BCL into harmony.

The system in accordance with the present invention may be used for aligning vehicles such as tractor trailer rigs having rigid frames. In such case, the laser transmitters will be aligned parallel to the frame rails and then wheel adjustments may be made from that point. The kingpin of the trailer will become the locating device for the laser column center 46 as the kingpin serves to define the exact equilibrium center and the axles should be aligned to it.

The system may also be employed for three wheel landing gear on aircraft as well as three wheel vehicles, each of which has a single front wheel. In such case, the forward or front wheel will be used as the locating device for the laser column 46 and then sensor heads, such as sensor heads 26 and 28 will be mounted to the rear wheels for use in determining the thrust line for alignment purposes.

Whereas the invention has been described in conjunction with preferred embodiments, it is to be appreciated that various modifications may be made to the components disclosed herein without departing from the spirit and scope of the present invention as defined by the appended claims.

Having described preferred embodiments of the invention, the following is claimed:

1. Apparatus for use in determining the relationship between a vehicle's thrust line and its body center line wherein said vehicle has at least one steerable wheel spaced longitudinally from a pair of laterally spaced nonsteerable wheels and comprising:

movable light source means located independently of and remote from said vehicle for establishing a pair of parallel reference light beams extending from a position located forwardly of said steerable wheel and directed rearwardly alongside and spaced outwardly from said nonsteerable wheels and wherein said light beams are spaced apart in parallel planes sufficient to permit said vehicle to be positioned substantially midway therebetween;

means for determining the thrust line of a said vehicle including a pair of sensor means each adapted to be mounted to one of said nonsteerable wheels and being positioned outwardly therefrom to intercept one of said reference beams, each said sensor means including detector means responsive to a said light beam for providing an output indication indicative of the location at which the beam impinges upon the detector means, and measurement means associated with both of said detector means for providing a measured output representative of the vehicle's thrust line location, and means for determining the vehicle's body center line, including a pair of forward body side targets each having an aperture therein and adapted to be removably mounted to like body side locations on opposite sides of the vehicle, the body targets being positioned outwardly from the vehicle's body sides by like amounts to permit the reference light beams to pass therethrough and a pair of rear targets adapted to be removably mounted to like body side locations on opposite sides of the vehicle but longitudinally spaced along and rearwardly from said front targets and being spaced outwardly from the vehicle's body sides by like amounts sufficient to intercept the light beams whereby to the extent that said movable light source must be displaced in a transverse direction from its thrust line determining position in order for the light beams to impinge at like locations on the rear body side targets is representative of the variance between body center line and the thrust line.

2. Apparatus as set forth in claim 1 wherein said movable light source means includes a pedestal support having support legs extending essentially horizontally outward therefrom, each said support leg having wheel means mounted thereto so that said pedestal support may be movably displaced relative to a said vehicle.

3. Apparatus as set forth in claim 2 wherein each said support leg is also provided with a screw jack extending therethrough for making engagement with a garage floor or the like for locking said pedestal in place relative to a said vehicle.

4. Apparatus as set forth in claim 2, including a center column mounted on said pedestal and extending essentially vertically upward therefrom and centrally located relative to said support legs.

5. Apparatus as set forth in claim 2, including an elongated housing extending essentially horizontally relative to said center column and being carried thereby and a pair of light beam transmitters, each said transmitter being adjustably mounted to a different end of said elongated housing.

6. Apparatus as set forth in claim 5 wherein each said light beam transmitter is carried at one end of a telescoping arm which is slidably received within one end of said elongated housing and which may be adjustably displaced transversely of said center column to adjust the position of the light transmitter with respect thereto.

7. Apparatus as set forth in claim 6 wherein each said telescoping arm is provided with measured scaling to assist an operator in adjusting the position of said transmitters at equal locations relative to said center column.

8. Apparatus as set forth in claim 7 wherein said elongated housing is provided with means for locking said telescoping arms in place at desired adjusted locations.

9. Apparatus as set forth in claim 5 wherein each said light transmitter may be pivotally adjusted relative to said elongated housing so the beam projected thereby may be moved in a plane perpendicular to said elongated housing.

10. Apparatus as set forth in claim 9 wherein each said light beam transmitter is a laser beam transmitter.

11. Apparatus as set forth in claim 9 including means for adjusting the vertical height of said horizontally oriented elongated housing and thereby adjusting the vertical height of said light beam transmitters.

12. Apparatus as set forth in claim 1 wherein said thrust line determining means includes support means for attaching each of said sensor means to one of said nonsteerable wheels and including a wheel clamp adapted to be clamped to a vehicle wheel and an elongated spindle mounted to said wheel clamp so as to extend outwardly of said wheel along an axis corresponding with the axis of rotation of said wheel.

13. Apparatus as set forth in claim 12 including means for adjustably positioning said spindle so that it coincides with the axis of rotation of said wheel.

14. Apparatus as set forth in claim 13 wherein said means for adjusting said spindle includes a carrying plate for carrying said spindle so that the spindle extends perpendicularly from said carrying plate, said carrying plate being spaced axially outward from said wheel clamp and means for adjustably varying the orientation of said carrying plate relative to said clamp so as to adjust the axis of said spindle to correspond with the axis of rotation of said wheel.

15. Apparatus as set forth in claim 12 wherein each said sensor means includes a housing having means for slidably receiving said spindle so as to adjust the location of said sensor housing relative to said wheel and means for adjustably locking said housing to said spindle at a desired location thereon.

16. Apparatus as set forth in claim 15 wherein said housing carries said detector means oriented so as to intercept a said light beam transmitted by a said light transmitter.

17. Apparatus as set forth in claim 16 wherein said detector means has a relatively flat light beam sensitive surface and which is carried by said housing so as to be oriented in a plane perpendicular to the plane of rotation of said wheel about its axis.

18. Apparatus as set forth in claim 17 wherein said light responsive detector is position sensitive to the location at which a said light beam is concentrated on its light sensitive surface and output means for providing output signals representative thereof.

19. Apparatus as set forth in claim 18 wherein said light sensitive surface has a central zero location defined by intersecting X and Y axes wherein said output means includes positive and negative X axis output circuits for carrying output signals having magnitudes representative of the X axis location at which said beam is concentrated and positive and negative Y axis output circuits for providing output signals having magnitudes representative of the Y axis location at which said beam is concentrated.

20. Apparatus as set forth in claim 19 including Y axis position indicating means located on said housing and circuit interconnecting means connecting said positive and negative Y axis output circuits to said indicating means for providing an visual indication to an operator as to the point of concentration at which the beam is concentrated on said detector along said Y axis.

21. Apparatus as set forth in claim 20 wherein said light beam transmitters are adjustable for varying the vertical height at which the respective light beam strikes a said detector surface so that the operator may adjust the point of impingement at the said zero location.

22. Apparatus as set forth in claim 19 wherein said light beam transmitters may be adjusted to vary the spacing between said parallel planes so as to vary the X axis point of impingement of said light beam on said detecting means so that the point of impingement may be the said zero location.

23. Apparatus as set forth in claim 19 wherein each said detector housing may be adjusted on its spindle relative to the plane of rotation of the associated wheel so that the point of impingement of said light beam on said detector means may be adjusted to the said zero location.

24. Apparatus as set forth in claim 19 wherein each said sensor means includes means for displacing said light beam detector means by a fixed amount from a zero position to a measuring position such that the point of beam concentration on said detector means at each position will be reflected by the magnitude of the output signals from the positive and negative X axis output circuits, and wherein a variance in said signals is representative of a toe measurement of said wheel.

25. Apparatus as set forth in claim 24 including meter means for providing an output visual reading representative of the said toe measurement.

26. Apparatus as set forth in claim 25 wherein the distance of detector movement from said zero position to said measuring position is a fraction 1/S of a standard wheel diameter reference used for toe measurements, and means for multiplying the output signals obtained from said positive and negative X output circuits by a factor of S so that the reading obtained by said output meters is representative of a toe measurement with respect to such standard.

27. Apparatus as set forth in claim 26 wherein said standard is a twenty inch diameter wheel and the distance between said zero position and said measuring position of said detecting means is two inches and said multiplying factor S is ten.

28. Apparatus as set forth in claim 25 wherein said output meters provide a toe measurement for each of said nonsteerable wheels, said light source means being movable along a line transversely of said vehicle so that the operator may position said light beams until the toe measurements for the left and right nonsteerable wheels are equal thereby defining the thrust line of the vehicle.

29. Apparatus as set forth in claim 28 wherein said forwardly located body side targets of said vehicle body center line determining means each includes a vertical slot permitting a said light beam to pass therethrough toward the said rear target.

30. Apparatus a set forth in claim 29 wherein said light source is movable so as to be moved in a transverse direction by the operator until the light beams impinge upon said rear body side targets at like horizontal distances from the body sides with the distance moved from that of the thrust line determining position being the measure of the variance of the vehicle's thrust line from that of the vehicle's body center line.

* * * * *